Figure 1:
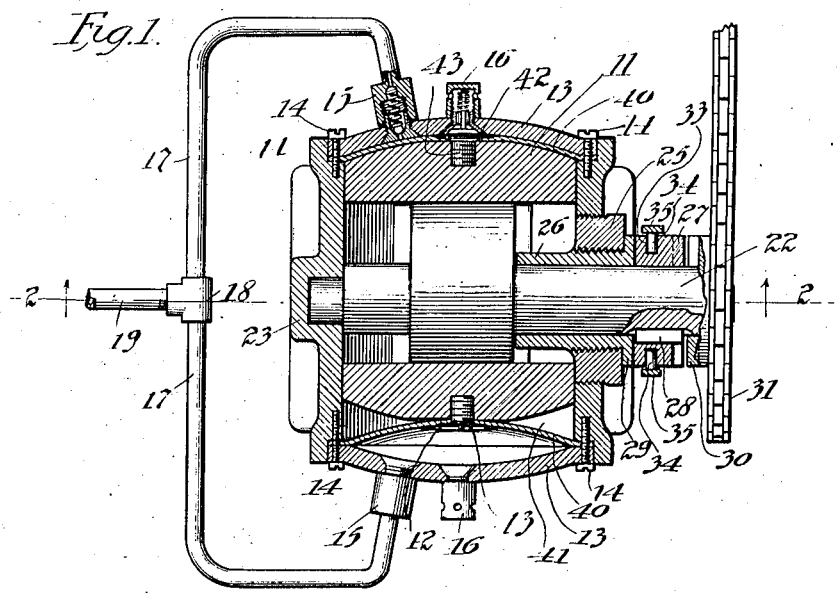

C. W. TARBET.
PUMP.
APPLICATION FILED DEC. 31, 1914.

1,206,943.

Patented Dec. 5, 1916.

Witnesses:
Robert H. Weir
Walter Nolen

Inventor
Clarence W. Tarbet
by Offield Towle Graves & Offield
Attys.

UNITED STATES PATENT OFFICE.

CLARENCE W. TARBET, OF CHICAGO, ILLINOIS.

PUMP.

1,206,943.  Specification of Letters Patent.  Patented Dec. 5, 1916.

Application filed December 31, 1914. Serial No. 879,843.

*To all whom it may concern:*

Be it known that I, CLARENCE W. TARBET, a citizen of the United States, residing in the city of Chicago, county of Cook, and State of Illinois, have invented certain new and useful Improvements in Pumps, of which the following is a specification.

My invention relates to improvements in pumps and, although it has many applications, it is particularly well fitted for embodiment in power-driven air-pumps carried by pneumatic tire vehicles.

Since the rapid growth of the automobile industry in recent years, it has come to be a common practice to equip cars with pumps driven from some moving part of the car or motor for the purpose of replenishing the tires with air if for any reason they become deflated. In fact, the motoring public has almost come to demand some such arrangement in order to be relieved from the arduous labor of pumping up the tires by hand. In some cases, in place of using a power-driven pump, the car is equipped with a storage tank containing a supply of air or other suitable gas under a very high pressure, but this arrangement, while very convenient while the tank is charged, necessitates frequent replacement of the empty tanks with full ones, and, in addition, introduces the danger of being caught with an empty tank far from home, when tire trouble develops. For this reason, most people prefer to equip the cars with power-driven air-pumps.

Of the pumps of the type described which are now on the market, the great majority, although of considerable weight and bulk, are of limited capacity and consequently unable to pump up a deflated tire to the proper pressure in a reasonable length of time, the loss of time being of course very marked when it is necessary to inflat a tire which for any reason may have become completely deflated. On the other hand, the few air-pumps on the market which are capable of supplying a sufficient amount of air and pressure to inflate a tire with reasonable speed, are usually of excessive weight and bulk and often extremely intricate in design. Many of these pumps also are open to the objection of becoming greatly overheated when they are operated at the desired speed. Other pumps also have the particularly vicious habit of exhaling lubricating oil which thus results in a gradual deterioration or disintegration of the rubber after the oil is forced into the tire.

The objects of my invention are, to provide a pump of the class described which may be constructed of comparatively large capacity, while at the same time of comparatively small weight and dimensions; to provide a pump of the class described which may be operated at high speed without danger of overheating; to provide a pump of the class described in which there is no fear of contaminating the fluid under pressure with the oil used to lubricate the working parts of the pump; to provide a pump which may be constructed of a comparatively small number of parts, and those of simple and rugged form; to provide a construction in which the working parts are so designed as to operate for an indefinite period without renewal of any of the bearing surfaces or other parts; to provide a pump which may be economically constructed in large quantities by means of automatic machinery, and, in general, to provide an improved pump of the class described.

Figure 2:
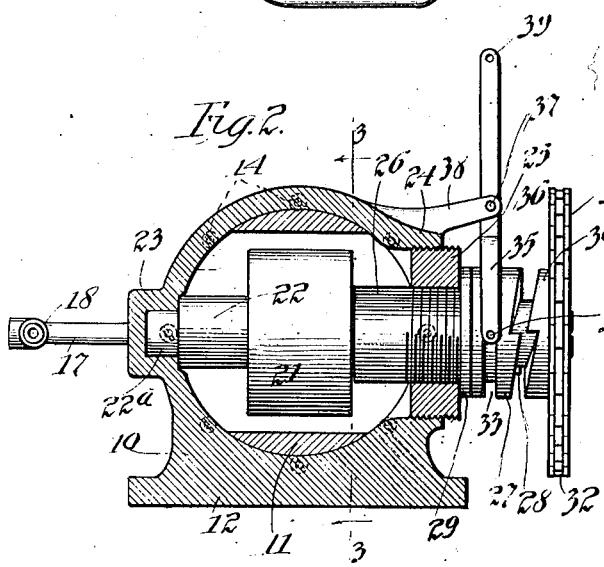
Figure 3:
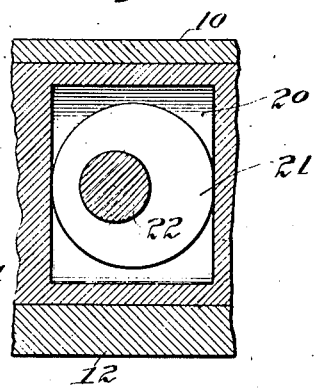

In the drawings illustrating an approved embodiment of my invention—Figure 1 is a sectional plan view of an automobile air-pump constructed according to my invention; Fig. 2 is a section of Fig. 1 taken on the line 2—2 of Fig. 1; and Fig. 3 is a fragmentary section taken on the line 3—3 of Fig. 2.

As showing the application of my invention, I have selected as an illustration a pump capable of being mounted upon any fixed part of the frame of an automobile and adapted to be driven from some moving part of the chassis equipment. In the drawings the main casing or frame of the pump 10 also constitutes the cylinder of the device in which is adapted to reciprocate a double-acting piston 11. In one side of the casing or cylinder, which is an integral casting of bronze, cast iron, or other suitable material, is formed an integral base or foot 12 which is adapted to be bolted or otherwise secured to the frame of the chassis or to the motor. The ends of the cylinder are completely incased by means of a pair of heads 13 which are securely bolted to the turned ends of the cylinder by means of a series of equally spaced screws or studs 14. These heads 13 are each provided with a pair of spring-actuated check valves 15 and 16, the valve 16 being in this case the intake for admitting atmospheric air, and 15 being the valve which prevents the compressed air from backing up into the cylinder of the pump. By inspection of the figures, it will be observed that I have made these valves 15 and 16 of extremely large area and consequent high capacity, so that the air passing through them will be throttled to a minimum extent. This throttling of the air through the valves is highly objectionable in pumps of this type, since it is often desirable to operate them at very high speed, and if the air passages are constricted, the difference in pressure between the air in the cylinder and the air on the other side of the valve is excessive and is apt to cause serious overheating. The exit valves 15 are connected by short L-shaped pipes which make a connection with a T 18 and the common pressure pipe 19 fitted thereon.

Describing the means for reciprocating the piston 11 in the cylinder 10, it will be seen that the piston consists of an extended piece of metal of cylindrical shape, which is imperforate longitudinally as regards its two ends, but in its center is cut out or slotted to form a transverse rectangular aperture extending diametrically from one side of the piston to the other. The distance apart of the adjacent ends of the slot in a longitudinal direction is such as to accommodate with proper freedom the cam or eccentric 21, keyed, or otherwise suitably secured, to the transverse operating shaft 22. This main shaft 22 also extends transversely across and diametrically of the cylinder and piston and is centrally located therein. The inner end of the shaft 22 is reduced slightly in its diameter so as to form a journal 22$^a$ which enters an inwardly opening cylindrical bore formed in a small boss 23 at the side and in the middle of the cylinder 10. The opposite wall of the cylinder 10, through which the outer end of said shaft 22 passes, is provided with a slight circular enlargement 24, which is bored out centrally of the shaft with a large hole threaded to accommodate a plug 25. The inner diameter of said large hole is great enough to admit the eccentric 21 when assembling the pump, the axial length of the journal 22$^a$ being relatively short so as to obviate the danger of the eccentric 21 striking the wall of the cylinder before the journal becomes disengaged. The bushing 26, the outer end of which is threaded to enter the annular plug 25, constitutes a bearing for the outer end of the shaft and also limits the axial movement thereof, since the inner end of the bearing 26 is extended until it engages the outer end face of the eccentric 21. On the outer end of the shaft 22 I mount a clutch member 27 which is adapted to slide upon the shaft, rotation thereof with reference to the shaft, being prevented by means of a key 28 seated in the exterior of said shaft. This clutch member 27 normally is in the position shown in Fig. 2, with its back end face in substantial contact with the outer face of the shoulder 29 on the end of the bushing 26; but when it is desired to operate the pump, it is moved endwise axially of the shaft and away from the cylinder 10 so as to engage a companion clutch member 30 formed on the inner end face of the hub of a chain or sprocket wheel 31, which is continuously driven from the motor by means of a silent chain 32, and rotates freely on the shaft 22. In order to facilitate the shifting of the clutch member 27 into or out of engagement with the clutch member 30, I turn in its exterior a rectangular groove 33 in which ride a pair of diametrically opposed pins 34 seated in the ends 35 of a fork 36 pivotally mounted at 37 upon a small bracket 38 cast integral with the frame 10 of the pump. The outer end 39 of the fork 36 is extended away from the pivot 37 a suitable distance to permit the application of a convenient link for operating the clutch.

The operation of the device is extremely simple. Normally the shaft is stationary when the pump is not in use, the chain wheel 31 rotating idly upon the end of the shaft 22. When, however, the clutch fork 36 is shifted so as to bring the clutch members 27 and 28 into engagement, the shaft commences to rotate and with it the eccentric. The eccentric 21, being of proper diameter to suitably engage the ends of the slot 20 as it rotates, thus causes a reciprocatory movement of the piston 11, and thus the pump is operated. It should be noticed that although, theoretically speaking, the wearing surface between the eccentric 21 and the ends of the slot 20 is a line contact, it should nevertheless be understood that this line contact is continually moving transversely of the cylinder to and fro across the wearing surface of the slot; consequently, lubrication is very effective and frictional wear is reduced to a negligible quantity.

In order to prevent oil from becoming mixed with and contaminating the air under pressure before it enters the tires of the car, I interpose between each end of the piston and the cylinder head a diaphragm 40 of suitable flexible material, such as leather or composition rubber fabric, which is clamped in an annular space 41 provided between the cylinder head and the end of the cylinder. The center of the diaphragm is secured to the center of the end of the piston by means of a washer 42 held by a flat-head screw 43 tapped into the center of the piston. The end of the piston adjacent to and around its center is flattened under the washer 42, but the remaining portion of its operating face is formed in the shape of a portion of a sphere so as to enter and fill a similar spherical cavity or swell formed in the inner face of each of the cylinder heads. The washer 42 and screw 43 are similarly turned off in spherical shape so as to enter the central portion of said spherical cavity in the cylinder head; and the dimensions of all of these parts and the stroke of the piston are such that when the latter reaches its extreme limit of outward movement, the end of the piston, diaphragm, and cylinder head are substantially in contact with each other, thus eliminating all clearance spaces, the presence of which would seriously interfere with the efficiency of the pump. It should be noted that the spherical shape of the piston end and cylinder head also tends to reduce the amount of bending of the diaphragm 40, since the point of attachment of the center of the diaphragm to the piston alternates in position an equal distance on either side of the normal plane of the diaphragm. It should also be noted that during the time that the diaphragm is largely without support from the end of the piston 11, the air pressure in the end of the cylinder cavity is comparatively slight, but when the air becomes compressed within the end of the cylinder during the final portion of the outward movement of the piston, the diaphragm is supported by the end of the piston over substantially its entire area, this being clearly shown in the upper portion of Fig. 1. Obviously, it makes little difference whether the working parts of the pump are over-supplied with oil or not, since such oil, even if it does work through between the piston and the cylinder head, cannot pass through the diaphragms 40, and thus the air compressed by the pump retains its original purity.

It will be manifest that the construction described is extremely rugged and substantial and free from complicated parts or mechanism. The provision of the diaphragms at the ends of the piston also enables me to make the piston a comparatively loose fit within the cylinder, since with the diaphragms there is no object in having airproof engagement between the wall of the piston and the cylinder. Thus, by the elimination of the customary spring rings and tight fitting engagement between said parts, which are necessary in ordinary pumps constructed without diaphragms, I am enabled to reduce to a minimum the friction of the piston sliding within the cylinder. Although I have shown the cylinder heads as being secured to the cylinder in such manner as to cause the exit pipes to project sidewise from the frame, yet it should be understood that the position of the heads may be changed readily by means of the screws with which said heads are clamped to the ends of the cylinder. Thus, the pump which, in itself is extremely compact, may be arranged for application in any desired location on the engine or frame of the car.

Although I have described what I consider to be a preferred embodiment showing the application of my invention to a pump of the class described, yet it should be understood that many details of my construction may be modified considerably without departing from the spirit of the invention, hence, I do not wish to be limited, except as specified in the appended claim.

I claim—

In a double-acting diaphragm pump, the combination of a relatively stationary cylinder provided with a closed head and suitable intake and outlet valves at either end, a cylindrical piston of sufficient length to prevent cramping, adapted to reciprocate in said cylinder between said heads and provided with an aperture extending diametrically through the piston intermediate the ends of the latter, a shaft diametrically arranged to rotate within said cylinder extending through the aperture of said piston and provided with an eccentric adapted to engage said piston; said piston having comparatively loose fitting engagement with said cylinder, and flexible diaphragms interposed between the ends of said cylinder and said piston.

CLARENCE W. TARBET.

Witnesses:
 C. A. SOANS,
 EMILIE ROSE.